(12) United States Patent
Gracie et al.

(10) Patent No.: US 9,767,018 B2
(45) Date of Patent: Sep. 19, 2017

(54) ALLOCATION AWARE HEAP FRAGMENTATION METRICS

(71) Applicant: International Business Machines Corporation, Armonk, NY (US)

(72) Inventors: Charles R. Gracie, Ontario (CA); Aleksandar Micic, Ontario (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 366 days.

(21) Appl. No.: 14/452,687

(22) Filed: Aug. 6, 2014

(65) Prior Publication Data

US 2015/0127623 A1 May 7, 2015

(30) Foreign Application Priority Data

Nov. 7, 2013 (CA) .................................... 2832571

(51) Int. Cl.
G06F 17/30 (2006.01)
G06F 12/02 (2006.01)
G06F 15/16 (2006.01)
(52) U.S. Cl.
CPC ................. G06F 12/0253 (2013.01)
(58) Field of Classification Search
None
See application file for complete search history.

(56) References Cited

U.S. PATENT DOCUMENTS

| 7,010,555 | B2 | 3/2006 | Blandy et al. |
| 7,035,989 | B1* | 4/2006 | Hinker .................. G06F 12/023 711/171 |
| 7,480,782 | B2 | 1/2009 | Garthwaite |
| 7,707,232 | B2 | 4/2010 | Dussud et al. |
| 8,195,721 | B2 | 6/2012 | Lindholm et al. |
| 2003/0229766 | A1* | 12/2003 | Dice .................. G06F 12/0261 711/154 |
| 2005/0268053 | A1* | 12/2005 | Sexton .................. G06F 11/3636 711/159 |
| 2006/0167961 | A1 | 7/2006 | Fox |
| 2008/0005208 | A1* | 1/2008 | Vaswani ............. G06F 11/3466 |
| 2009/0019249 | A1* | 1/2009 | Kessler ................. G06F 9/4428 711/170 |

OTHER PUBLICATIONS

Baishnab et al; An efficient heap management technique with Minimum Fragmentation and Auto Compaction, Jul. 9-11, 2010, URL:http://ieeexplore.ieee.org/xpl/articleDetails.jsp?tp=&arnumber=5563690&contentType=Conference+Publications&queryText%3Dheap+fragmentation.
Estimating the average allocation size, QNX Momentics IDE User's Guide, URL:http://www.qnx.com/developers/docs/6.5.0/index.jsp?topic=%2Fcom.qnx.doc.ide.userguide%2Ftopic%2Fmemory_EstimatingAllocationSize_.html.

* cited by examiner

*Primary Examiner* — Alex Gofman
(74) *Attorney, Agent, or Firm* — Garg Law Firm, PLLC; Rakesh Garg; Scott S. Dobson

(57) ABSTRACT

An illustrative embodiment of a computer-implemented method for estimating heap fragmentation in real time, models a runtime view of free heap memory, models a runtime view of heap allocation patterns for the heap memory and takes a snapshot of the heap memory. A batch allocator simulator is executed at a predetermined event and a remaining amount of memory unused in the simulation is identified as fragmented memory.

18 Claims, 8 Drawing Sheets

Fragmentation metric system
116

ALLOCATION AWARE HEAP
FRAGMENTATION METRICS

BACKGROUND

1. Technical Field

This disclosure relates generally to heap fragmentation in a data processing system and more specifically to allocation aware heap fragmentation metrics in the data processing system.

2. Description of the Related Art

Garbage collectors (GC) and associated allocators typically view free memory statically as a collection of free entries in a heap. When a predetermined set of free memory entries are small in size, the memory is considered fragmented. When fragmentation exceeds a predetermined threshold, garbage collectors may decide to de-fragment the memory, typically by compacting live objects in the memory. Commercially available garbage collectors use various compaction triggers including when a percentage of free memory after a collection is determined to be less than a predetermined percentage and an inability to allocate a large object, although having a sufficient amount of free memory according to an average size of thread-local-heap allocated between two garbage collector cycles.

In another current example of garbage collection, scheduling and managing which area of heap to be used for allocation is a focus. In another example a garbage collector focuses on compaction rather than fragmentation. Another example deals with allocation, and methods to at least minimize fragmentation and a need for compaction.

The triggers also referred to as fragmentation metrics are not sufficiently dynamic and are typically invoked too late. The triggers also typically have little or no knowledge of how a particular application (allocation) behaves with respect to memory usage. The triggers observe fragmentation only after a serious problem is detected.

There is a need for a trigger that can predict problems associated with memory allocation before the problems occur. Modern garbage collectors typically rely on accurate scheduling of concurrent global garbage collection, which in turn also relies heavily on accurate information regarding available free memory as the allocation process progresses. When concurrent garbage collection is not able to finish before free memory is exhausted, a garbage collector is required to perform relatively expensive operations including abort of local garbage collection, complete global collection using a stop-the-world mode, and typically perform a global compaction. When memory is fragmented, not all statically available memory can be used as input information for concurrent garbage collector scheduling. The available memory therefore has to be reduced by an amount of memory that is fragmented. To accurately identify the fragmented memory, a better metric is required.

SUMMARY

According to one embodiment, a computer-implemented method for estimating heap fragmentation in real time, models a runtime view of free heap memory, models a runtime view of heap allocation patterns for the heap memory and takes a snapshot of the heap memory. The computer-implemented method further executes a batch allocator simulator, at a predetermined event and identifies a remaining amount of memory unused in the simulation as fragmented memory.

According to another embodiment, a computer program product for estimating heap fragmentation in real time comprises a computer readable storage device containing computer executable program code stored thereon. The computer executable program code comprises computer executable program code for modeling a runtime view of free heap memory; computer executable program code for modeling a runtime view of heap allocation patterns for the heap memory; computer executable program code for taking a snapshot of the heap memory; computer executable program code for executing a batch allocator simulator, at a predetermined event; and computer executable program code for identifying a remaining amount of memory unused in the simulation as fragmented memory.

According to another embodiment, an apparatus for estimating heap fragmentation in real time comprises a communications fabric; a memory connected to the communications fabric, wherein the memory contains computer executable program code; a communications unit connected to the communications fabric, an input/output unit connected to the communications fabric, a display connected to the communications fabric and a processor unit connected to the communications fabric. The processor unit executes the computer executable program code to direct the apparatus to model a runtime view of free heap memory; model a runtime view of heap allocation patterns for the heap memory; take a snapshot of the heap memory; execute a batch allocator simulator, at a predetermined event; and identify a remaining amount of memory unused in the simulation as fragmented memory.

BRIEF DESCRIPTION OF THE SEVERAL
VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable data storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle Corporation, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage device that can direct a computer or other programmable data processing apparatus to function in a particular manner, such that the instructions stored in the computer readable data storage device produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
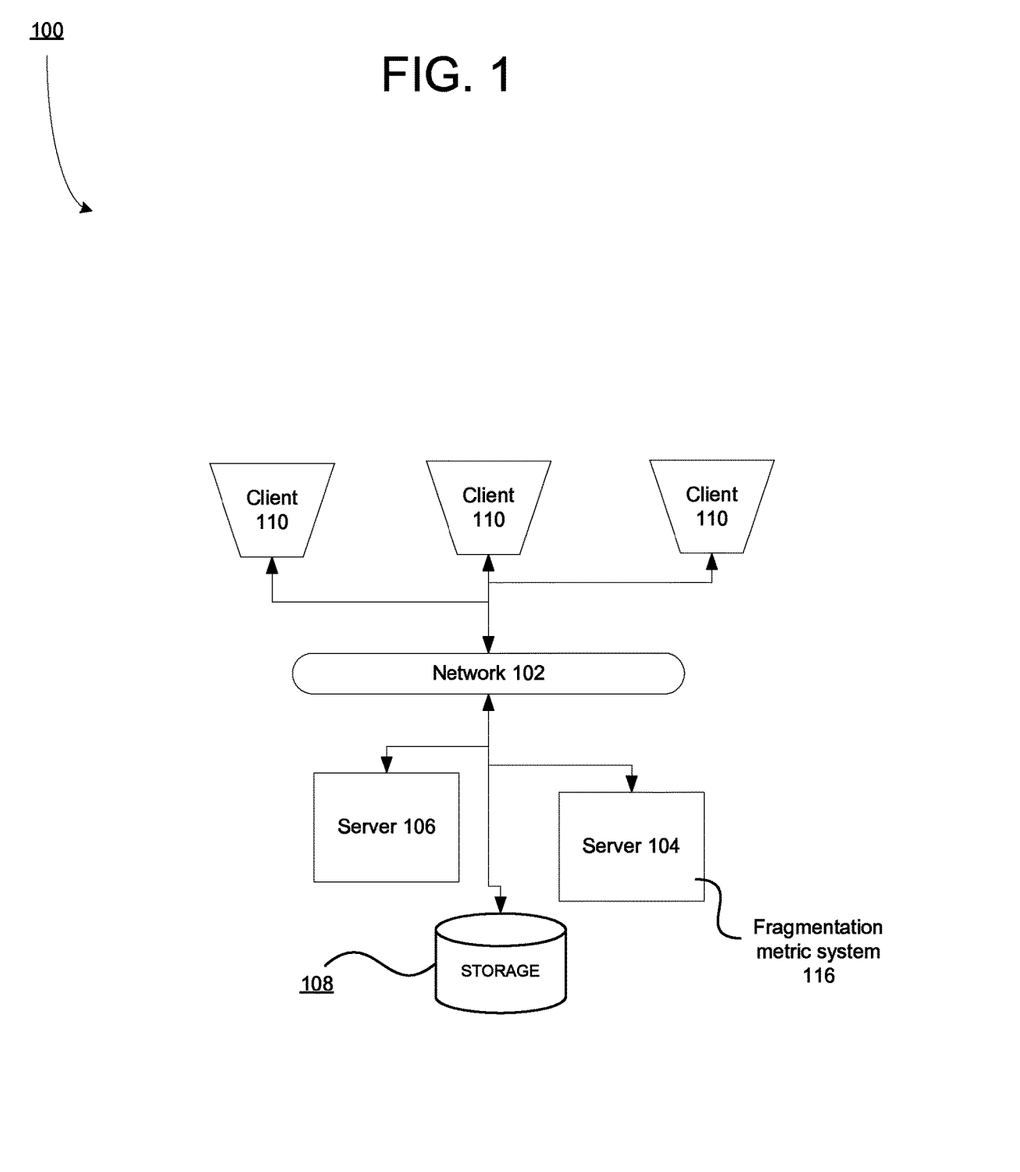
FIG. 1 is a block diagram of an exemplary network data processing system operable for various embodiments of the disclosure.
Figure 2:
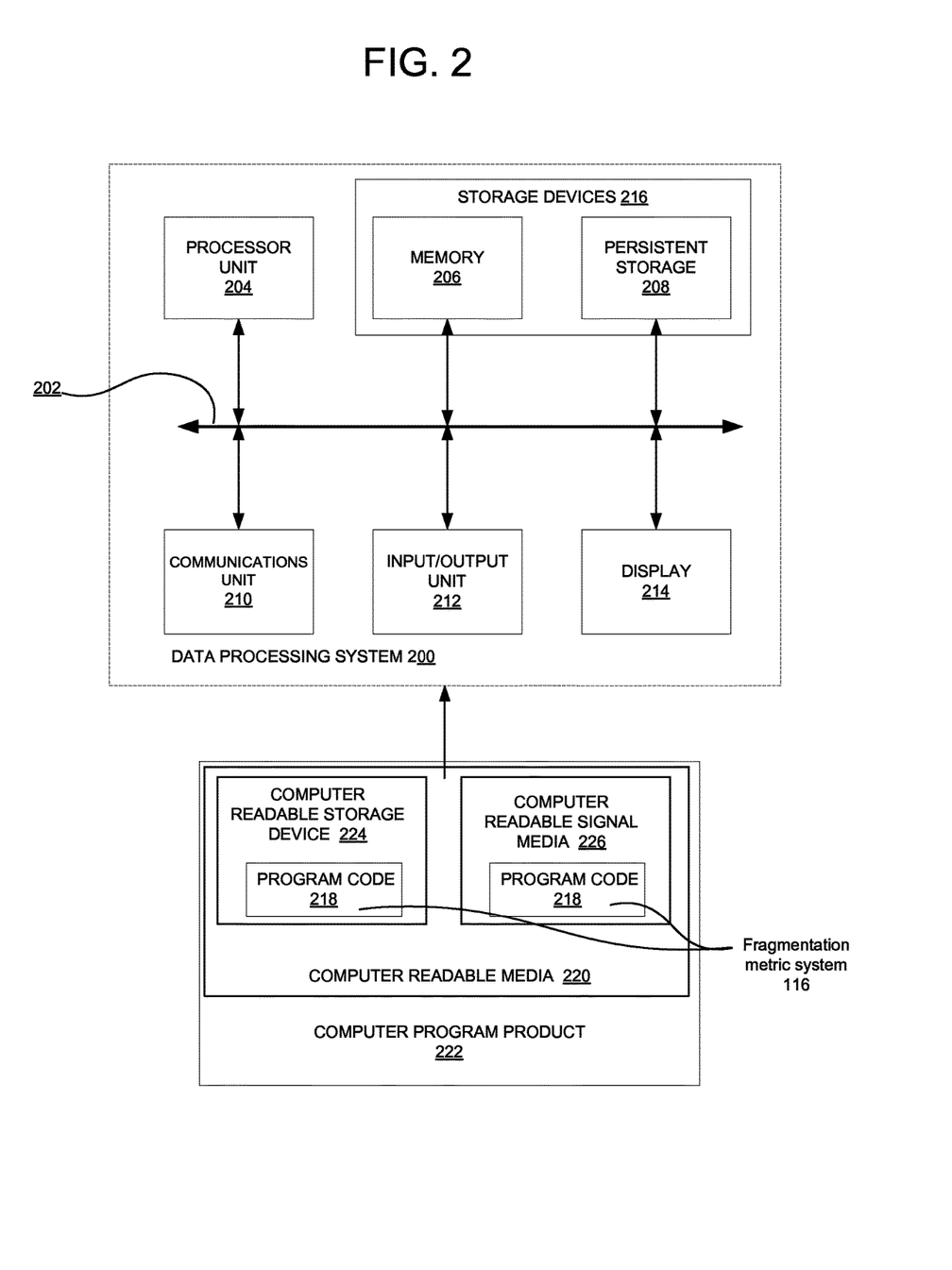
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable media 220 is also referred to as computer recordable storage media or a computer readable storage device 224. In some instances, computer readable media 220 may not be removable.

Alternatively, program code 218 may be transferred to data processing system 200 from computer readable media 220 through a communications link to communications unit 210 and/or through a connection to input/output unit 212 as computer readable signal media 226. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for estimating heap fragmentation in real time is presented. Processor unit 204 models a runtime view of free heap memory and models a runtime view of heap allocation patterns for the heap memory. Processor unit 204 further takes a snapshot of the heap memory. A batch allocator simulator is executed by processor unit 204 at a predetermined event and a remaining amount of memory unused in the simulation is identified by processor unit 204 as fragmented memory.

In an illustrative embodiment, a method for estimating or projecting heap fragmentation is disclosed. The method of the disclosure is not a simple static metric, which is only based on a heap state; rather the method as disclosed is dynamic and aware of application allocation patterns.

Embodiments of the disclosure include modeling of a simplified runtime view of free heap memory, modeling of a simplified runtime view of heap allocation patterns and at predefined points in a process, take a snapshot of the memory view and execute a fast batch allocator simulator driven by a current allocation profile until the memory is exhausted. Whatever memory is left unused in the snapshot (sum of the sizes) is accordingly considered fragmented memory.

Using an embodiment of the disclosed method provides a capability for a simple and effective semantic interpretation of the proposed metric. For example, at any determined point, a garbage collector need only subtract an amount of fragmented memory estimated from a total amount of free memory and using a remaining amount of memory that is not fragmented make appropriate decisions including projecting a start of concurrent global collection. An embodiment of the disclosure is accordingly dynamic, with low overhead and relatively high precision.

In another example, as an allocation profile changes and/or longevity of objects changes, the fragmentation metric will accordingly adapt with the changes. Use of an embodiment of the disclosed method typically yield results in which free memory calculations and allocation profiles are typically within a 5% error margin, while a final fragmentation estimate using an embodiment of the disclosed method is typically within 10-20% error margin. The precision of the estimates or predictions typically improves, as the heap has less free memory. A performance penalty regarding overall throughput using an embodiment of the disclosed method is typically small (for example, approximately under 0.5% for throughput and approximately 1 ms of pause time), while potential benefits include avoiding operations comprising aborted scavenges, and compactions.

Embodiments of the disclosure rely on a posteriori knowledge. Therefore embodiments of the disclosure use information associated with prior observations for predicting future behavior (realistic availability of free memory) and to avoid unwanted scenarios involving relatively expensive garbage collection activity.

Figure 3:
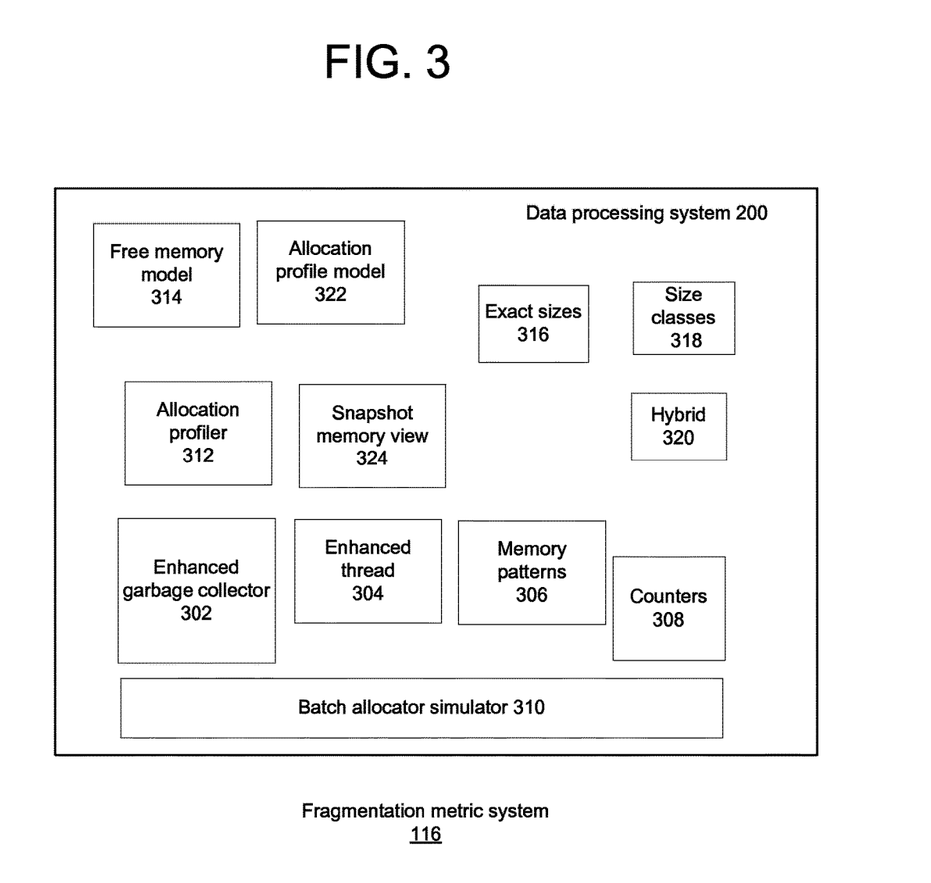
FIG. 3 is a block diagram of a fragmentation metric system operable for various embodiments of the disclosure.

With reference to FIG. 3 a block diagram of a fragmentation metric system operable for various embodiments of the disclosure is presented. Fragmentation metric system 116 is an example embodiment of the disclosure.

Fragmentation metric system 116 leverages an underlying supporting system such as data processing system 200 of FIG. 2 or server 104 of network data processing system 100 of FIG. 1 to provide supporting services typically provided to applications and subsystems by a data processing.

Fragmentation metric system 116 includes a number of functional components, which may be implemented as a set of discrete functions and data structures or combined in differing combinations of more or less components than depicted without loss of function. Fragmentation metric system 116 includes a number of functional components comprising enhanced garbage collector 302, enhanced thread 304, memory patterns 306 counters 308 and batch allocator simulator 310, allocation profiler 312. Data structures including exact sizes 316, size classes 318, hybrid 320, are used in support of free memory model 314, and allocation profile model 322. Snapshot memory view 324 captures information associated with status of heap memory.

Enhanced garbage collector 302 provides a capability to receive and react to notifications provided as result of processing fragmentation metrics using an embodiment of the disclosed batch allocator simulator. For example, when a result of a simulation iteration of the batch allocator simulator estimates no fragmentation, enhanced garbage collector 302 may schedule a scheduled collection cycle earlier than would be done without the fragmentation information.

Enhanced thread 304 provides a capability to maintain a local data structure (a table in the current example embodiments) for exact sizes and size classes for each allocating thread.

Memory patterns 306 are established by allocation profiler 312, which provides a capability to maintain counts of memory allocation sizes and statistics for historical averaging.

Counters 308 provide a capability to track allocations according to exact size, size classes and a hybrid of both. Examples of counters are provided in FIGS. 4-6 and related text.

Batch allocator simulator 310 provides a capability to collect sizing and frequency information associated with memory allocation, perform a computed simulation in real time using the collected information and provide an estimate or projection of heap memory utilization used to determine whether memory fragmentation exists or is imminent. Batch allocator simulator 310 accounts for estimated utilization of heap memory and thread local heap memory to provide a view of large and small object allocation impact on memory consumption. An overview a process of batch allocator simulator 310 is provided in FIG. 8.

Data structures including exact sizes 316, size classes 318, hybrid 320, provide a capability to track utilization statistics regarding memory allocation. In particular the data structures represent respective usage in differing approaches to gathering and collecting real time information specific to sets of large objects and small objects allocation in heap memory and thread local heap memory.

Free memory model 314, provides a view of memory allocation occurring in heap memory usage. Free memory model 314 uses two sets of counters: for size classes and for frequent allocate sizes. The counters are updated in real time during garbage collection activity including sweeps as well as during allocations and heap resize operations. An example of the counter use is provided in FIG. 6.

Allocation profile model 322 also provides a view of memory allocation occurring in heap memory usage. Allocation profile model 322 concurrently maintains exact-size statistics and size-class statistics as well as a hybrid view of the tables containing exact-size statistics and size-class statistics, where each entry is represented by an exact size. An example of the counter use is provided in FIG. 5.

Snapshot memory view 324 provides a representative status of heap memory for a particular point in time. The information captured is used in comparative calculations during simulations using batch allocator simulator 310 to estimate an amount of fragmentation occurring.

Embodiments of the disclosure provide a capability of gathering statistics about object allocation patterns and rates and enabling use of the data to predict through simulation using batch allocator simulator 310 how memory fragmentation will affect future allocations enabling proactive steps to address memory fragmentation and thereby avoid potential allocation failures.

Embodiments of the disclosure rely on an ability to gather statistics about object allocation patterns and rates. Typically when this information is not already available, it would be an invasive change to insert necessary code to collect and manage the data. The allocation simulator of the disclosure is optimized to ensure a cost of modeling is relatively insignificant when compared to the savings attributed to using an embodiment.

Embodiments of the disclosure provide a new capability, for a low overhead cost, to estimate how memory fragmentation is affecting object allocation, so steps can be taken to avoid an allocation failure. An allocation failure results in an expensive stop-the-world garbage collection. Embodiments of the disclosure reduce application garbage collection pause time, for example, times when an application is non-responsive. A performance improvement associated with using an embodiment of the disclosure depends on a particular application, how the application fragments memory, and the number and size of live objects used in the application. Embodiments of the disclosure apply to concurrent garbage collection algorithms.

An ability of an embodiment of the disclosure to determine when object heap fragmentation requires objects to be compacted can reduce garbage collection pause times, which typically improves a quality of service for applications which use a concurrent garbage collection policy Allocation simulation and fragmentation detection/prediction are not new concepts; however a combination used at runtime (rather than offline or post-mortem) without impacting performance of the system provides a new opportunity to better manage garbage collection operations.

Most concurrent garbage collection trigger points deal with a consumption rate of memory and/or a free amount of memory remaining. Embodiments of the disclosure also consider types of remaining sizes (which are dynamically adjustable) and summarize events in a runtime capable system to both react and estimate upcoming behavior of a dynamically changing system. This disclosed capability enables the system to predictively estimate an amount of "free memory" to be consumed before the system will be "out of memory". This disclosed capability summarizes the data in an optimal system to enable batch playback and makes the summarized data useable during execution of the environment without severely impacting performance.

Misprediction of concurrent garbage collection triggers can lead to either unnecessary pauses (for example, collecting too soon) or unnecessarily long pauses (unable to complete concurrent work before an out of memory condition arises). Garbage collection pause time is often a key criterion for applications. The ability to determine when object heap fragmentation requires resolution can reduce garbage collection pause times, which improves quality of service for applications, which use a concurrent garbage collection policy.

Embodiments of the disclosure accordingly improving triggering of garbage collection points (predictive) such that the pause times are reduced and enable during runtime dynamically adjusting tracking and prediction of behavior, which does not only pick a core algorithm but uses historical data in current runs to adjust and select a best timing for garbage collection triggers.

Figure 4:
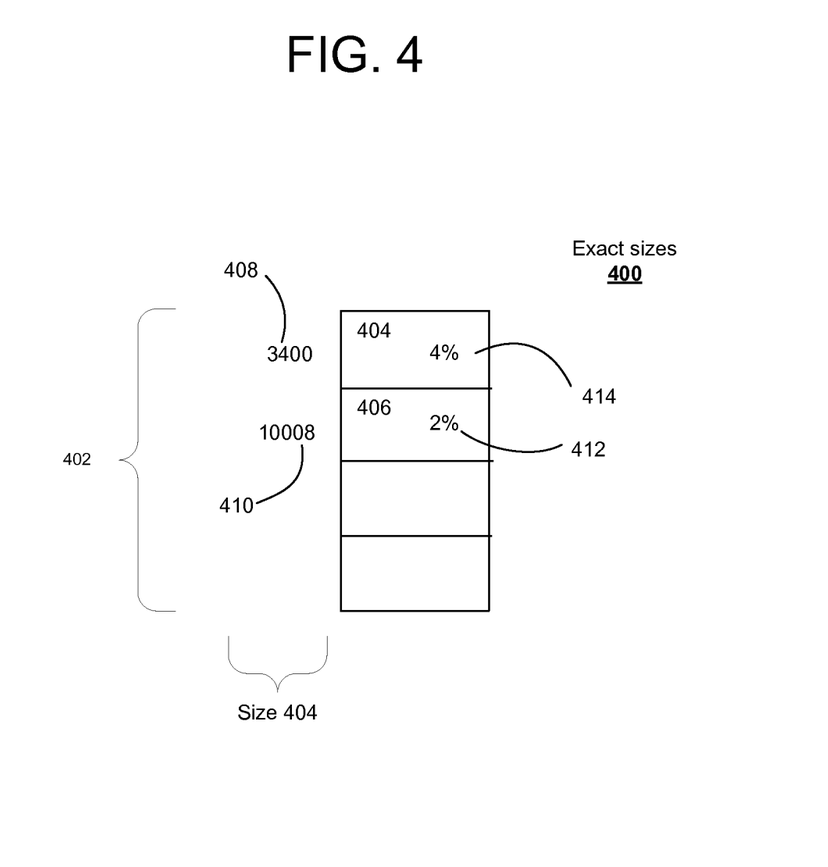
FIG. 4 is a block diagram of a size data structure for various embodiments of the disclosure.

With reference to FIG. 4 a block diagram of a size data structure for various embodiments of the disclosure is presented. Size data structure 400 is an example of an exact size data structure used with an allocation-profile model in an embodiment of the disclosure.

Each of the allocation-profile model and the free-memory-view model, for calculation efficiency reasons, track only large sizes of memory allocation in which large is typically defined as >512 bytes. Allocation-profile model 322 uses a known algorithm for the top-K frequent items in a data stream wherein K is set to a low double-digit or single digit number (for example, 16). In a simplest implementation example, it is sufficient to track exact allocate sizes wherein each unique size has a respective counter.

Exact sizes 400 represent a tabular data structure comprising a number of elements or cells 402 comprising a top 16 frequent items in memory allocation sizes. Size 404 represents a set of respective exact sizes, in bytes, of each corresponding cell. For example size 408 indicates an allocation of 3400 bytes is associated with cell 404. Cell 404 further indicates a frequency 414 having a value displayed of 4%. The frequency value indicates a relative portion of allocations of the indicted size. In a corresponding example cell 406 is of a size 410 of 10008 bytes and indicates a frequency 412 having a value displayed of 2%.

Figure 5:
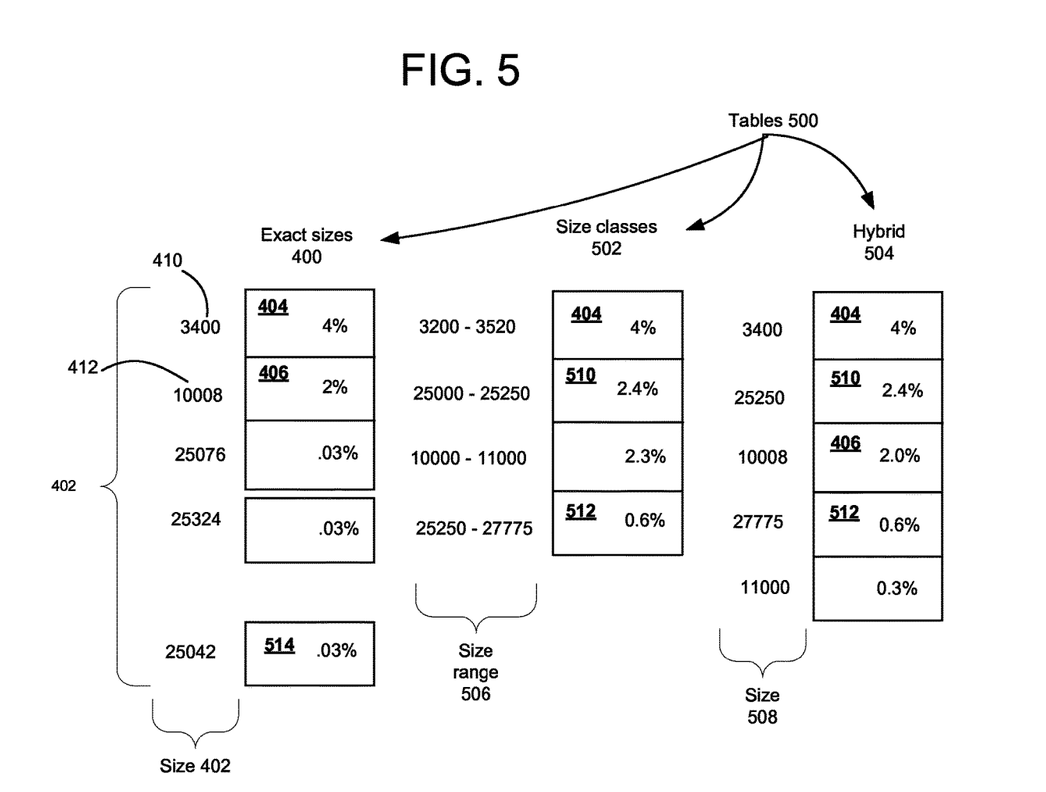
FIG. 5 is a block diagram of a set of size data structures for various embodiments of the disclosure.

With reference to FIG. 5 a block diagram of a set of size data structures for various embodiments of the disclosure is presented. Tables 500 are an example of an exact size data structure, a size of classes data structure and a hybrid data structure used with allocation-profile model in an embodiment of the disclosure.

Exact sizes 400 of FIG. 4 are further defined in this example with the addition of cells through to cell 514. Cell 514 represents a size of 25042 bytes and has an associated frequency value of 0.03%. Sometimes, an application may have a high number of different allocation sizes that vary very little in size. It may also be a number of the allocations do not to fit into an exact size table, such as exact sizes 400 but a total amount of allocates could be considerable and therefore worthwhile tracking. Grouping of sizes into size-classes, for example, size classes 502, where there is a constant ratio between size class boundaries (for example, 10%) is an alternative.

In the example, exact-size statistics, as in exact sizes 400 and size-class statistics as in size classes 502, are maintained concurrently. In this example, 100 of sizes are close to an allocation of 25000 bytes or just above, each with 0.03% frequency. Only 14 of the allocations however will fit into an exact-size table, because 2 out of 16 allocations are already occupied. Therefore a process will miss accounting for 100−14=86% of the allocations. In another example, there could be various allocate sizes in a range of 10000-11000 bytes, but different from an exact size of 10008 bytes, which belongs to the same size-class range, that do not fall into the exact-size table. Size classes 502 therefore will be able to account for all of the various sizes. Note in size classes 502 size range 506 is a set of values in which a value of 10000-11000 bytes in one instance has slightly higher usage of 2.3% than the exact size usage of size 412 having a size value of 10008 bytes and a frequency of 2.0%.

For each update (increment on allocation) of size classes 502, there is log(x) operation to find a representative of size class between a low bound and a high bound).

Occasionally at points when the content of size classes 502 is consumed, for example, local collections in a case of a generational collector, a hybrid view of size classes 502 can be created, wherein each entry is represented by an exact size. Size class ranges are represented by the largest possible size in the particular range, as shown in the set of sizes in size 508 of hybrid 504.

For example, cell 510 is associated with a range of 25000-25250 bytes with a usage of 2.4%. When represented in hybrid 504, the instance of size range 506 is collapsed to the largest possible size in the particular range, a value of 25250. In a similar manner cell 404, 406, 510 and 512 are carried over from exact sizes 400 and size classes 502 respectively. Size 11000 would represent all sizes between 10000-11000 except exact size 10008 that is represented by its own entry in cell 406.

To handle a multi-threaded aspect, and historic averaging a local data structure for exact sizes and size classes can be created for each allocating thread. The data structures track exact counts of allocations. However, sorting criteria would not be by the count, rather the total size of allocations. For example, in a situation with 9 allocations of objects of size 1K bytes would place lower than a single allocation of an object of size 10K bytes. At predetermined intervals, counters from all threads are merged, expressed in percentages and averages with historic values. A particular implementation may compromise precision for speed by not maintaining views of size classes 502 and hybrid 504.

When tracking allocations lower than max Thread Local Heap (TLH) size, objects larger than maxTLHsize (typically 128 KB in size) are relatively easy to track because the allocation always go out-of-line and into garbage collection code. However objects <=maxTLHsize are harder to track. The smaller objects can easily fit into thread local heap making the object allocation invisible to the garbage collection code as performed in-line by just in time compiled code that does not do the allocation tracking.

TLH allocations are tracked using the disclosed method. Whenever a current thread local heap is exhausted allocating a new thread local heap refreshes the thread local heap. Whenever a new thread local heap is allocated the size is recorded. In thread local heap that is not fragmented, the size will often be a maximum (128 KB), but the size might also be less. The size of thread local heaps is tracked in a similar manner (using similar type of structures) used to track free memory (explained later), but not same as that which is used to track out-of-line allocates (as previously explained).

Thread local heap allocates are tracked between two successive garbage collection cycles (therefore allocCounts are reset after each garbage collection).

The method used, when tracking both out-of-line allocates and thread local heap sizes, is very similar to how free memory is tracked, as described in following segments. The total number of allocates is probabilistically extrapolated for each allocation size, as in the following set of calculations. For a given allocation size, iterate through a profile of thread local heap sizes (represented by a pair of tlhSize and tlhAllocCount) and calculate the following values:

probabilityAllocFits=(tlhSize−allocSize)/tlhSize
thisTlhSizeBytesAllocated=tlhAllocCount*tlhSize
thisAllocSizeTlhBytesAllocated+=
probabilityAllocFits*thisTlhSizeBytesAllocated upon completion of iterating through the particular TLH size profile, calculate up-sample-ratio for the particular allocate size:

upSampleRatio=totalTlhBytesAllocated/(totalTlhBytesAllocated−thisAllocSizeTlhBytesAllocated)

a final extrapolated amount of bytes allocated by this particular size is: sampledBytesAllocated*upSampleRatio.

The variable objectPercent is calculated for each of frequent allocate sizes (as maintained in an allocation profile view) as total amount of bytes for that size (extrapolated for sizes <max TLH size)/total amount of bytes allocated, between two GCs. The value calculated is also historically averaged over time.

Figure 6:
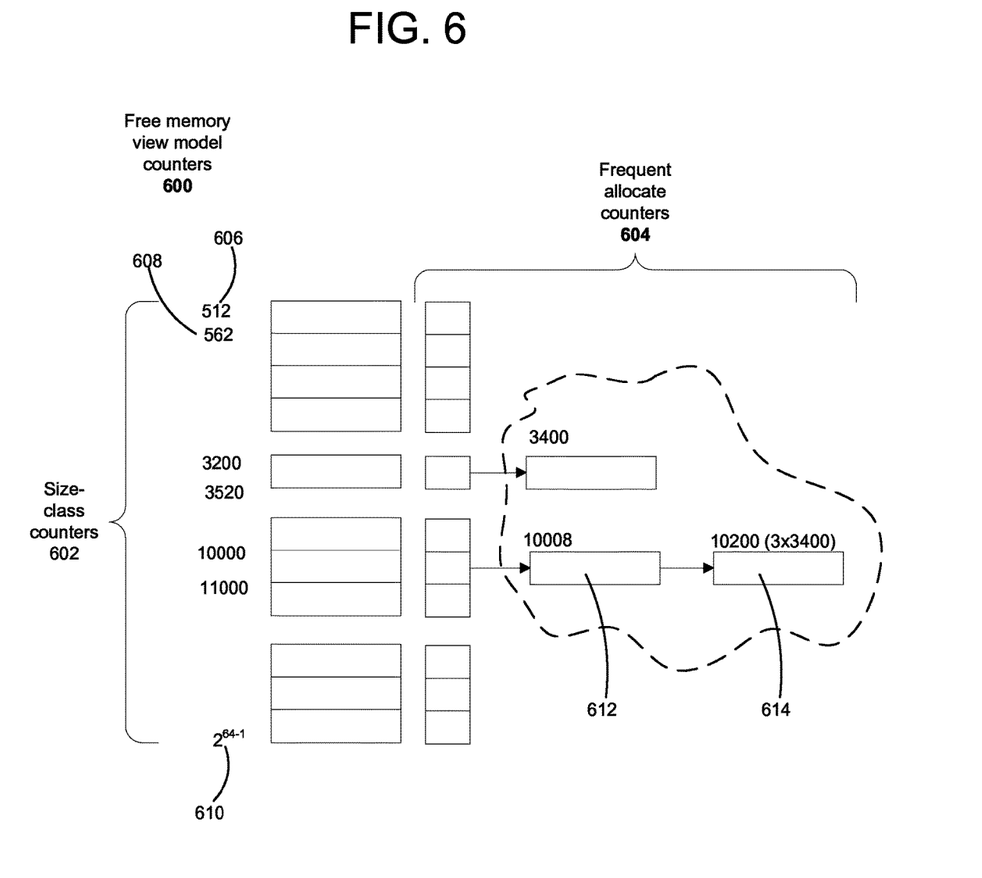
FIG. 6 is a block diagram of a set of counters for various embodiments of the disclosure.

With reference to FIG. 6 a block diagram of a set of counters for various embodiments of the disclosure is presented. Free memory view model counters 600 are an example of a set of size-class counters 602 and a set of frequent allocate counters 604 used with a free-memory-view model in an embodiment of the disclosure.

The two sets of counters, size-class counters 602 for size classes and frequent allocate counters 604 for frequent allocate sizes, are updated in real time during garbage collection operations including sweep, as well as during allocations and heap resize operations.

A memory view provided in the free memory view model is referred to as being semi-accurate. The view is accurate with respect to a number of free entries and approximate in respect, in general, to the sizes of entries being underestimated. For example, a heap is split into approximately 500 (64 bit) size-classes with approximately a 10% size class ratio, which is the same as for the allocation profile. In the example, size classes range from 512 bytes in cell 606 to cell 610 having a size of $2^{64-1}$ bytes (or lower, up to actual size of heap). Each size class has an accurate count of entries that fit within a boundary of two neighboring size classes, such as cell 606 and cell 608. Each size class has an optional list of counters for frequent sizes (as identified by an allocation profiler) and multiples of frequent sizes (typically, 2×-5×). The list of counters for frequent sizes aids in accuracy of both the free memory model and the batch allocation simulator. Errors are bounded to approximately 10% with an average typically less than 5%.

When a free entry size is not an exact match of a frequent size, or a multiple thereof, a closest (lower) representative is used. The representative can be a frequent size, such as cell 612 and not only a generic size-class. For example, using a free entry of 10400 bytes, the entry is represented as size of 10200, as in cell 614 (which is a multiple of 3400) which is a more precise representation than a placement in a generic 10000-11000 size class).

Figure 7:
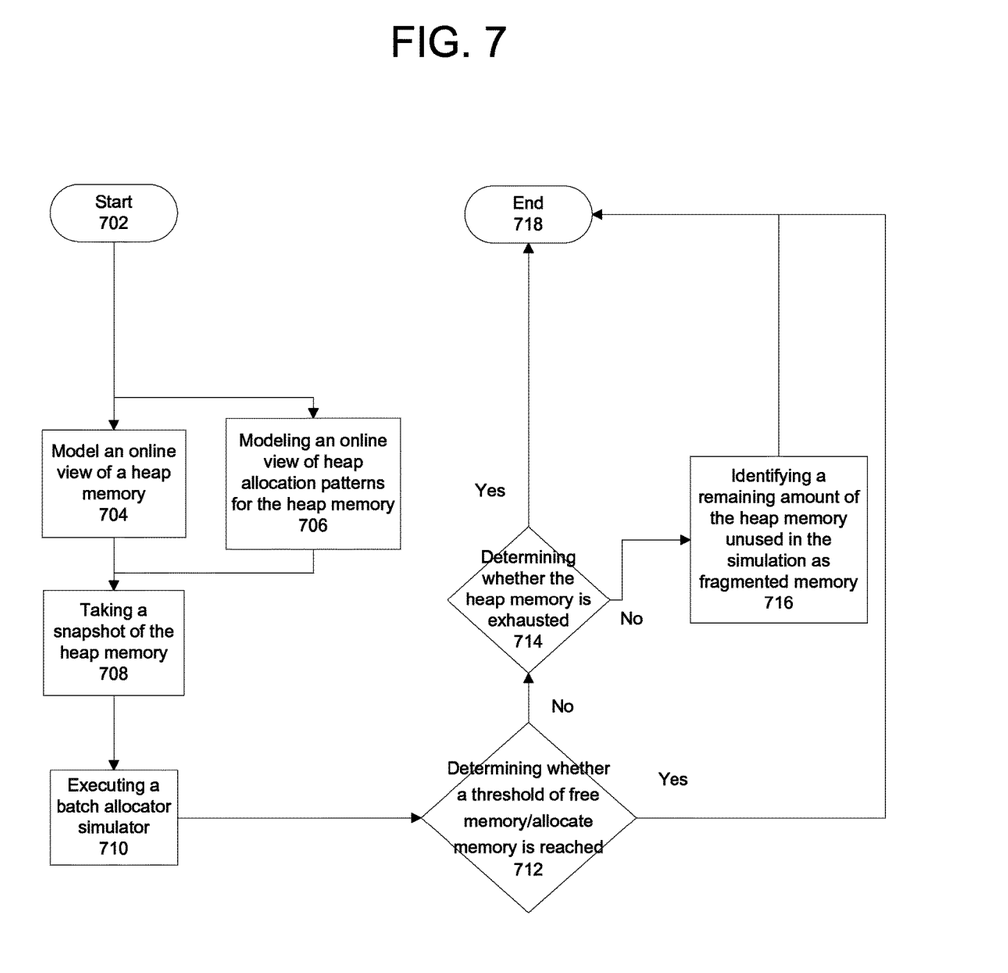
FIG. 7 is a flowchart of a process of using fragmentation metrics for various embodiments of the disclosure.

With reference to FIG. 7 a flowchart of a process of using fragmentation metrics for various embodiments of the disclosure is presented. Process 700 is an example of a process using the batch allocate simulator of fragmentation metric system 116 of FIG. 3 in an embodiment of the disclosure.

Process 700 is an example of a method for estimating heap fragmentation in real time, which begins (step 702) and models a runtime view of free heap memory (step 704). Different modeling may be used, including the free-memory-view model and the allocation profile model as disclosed previously.

Process 700 models a runtime view of heap allocation patterns for the heap memory (step 706). Process 700 takes a snapshot of the heap memory (step 708). A determination as to when to take snapshot may be driven by a configurable time interval or event or on demand at a particular instance. Typically a snapshot occurs at an initial point of garbage collection and in particular a local garbage collection when using a generational collect. The modeling of step 704 and step 706 in process 700 is of a continuously active form wherein any heap allocating thread also updates the views. The processing during step 704 and step 706 merges all of the partial data from all allocating threads into a single collection of data.

Process 700 executes a batch allocator simulator (step 710). The batch simulator is used to simulate iterative allocation of objects in a remaining free portion of the heap memory of interest. The allocation simulation uses information obtained in step 704 and step 706 including allocation profile information until an amount of the heap memory is exhausted during a simulation run or until a predetermined allocation threshold is reached.

Process 700 determines whether a predetermined threshold of free memory/allocate memory is reached (step 712). Responsive to a determination the predetermined threshold of free memory/allocate memory is reached process 700 terminates thereafter (step 718). The batch allocator simulator does not necessarily have to run until exhaustion, but can terminate early when a predetermined and configurable threshold of free memory/allocate memory is reached.

Use of a predetermined and configurable threshold of free memory/allocate memory enables testing of a condition in which a specified amount of memory is able to be allocated from a given heap state. The actually amount of the threshold can be much smaller than the available memory of the heap, making the testing much faster.

For example, when using the scheduler of concurrent garbage collection, the scheduler knows how long a concurrent garbage collection lasts (in terms of bytes allocated from heap), so the scheduler really does not need to know an absolute amount of fragmentation, but only that there is enough available non-fragmented memory in the heap so that if concurrent garbage collection is scheduled now it will finish in time.

When the predetermined and configurable threshold of the test is set to infinity (or in practice the actual total heap size), the test degenerates to one, which runs until heap memory is exhausted.

Responsive to a determination the predetermined threshold of free memory/allocate memory is not reached process 700 determines whether the heap memory is exhausted (step 714). Responsive to a determination the heap memory is not exhausted, process 700 identifies a remaining amount of the heap memory unused in the simulation as fragmented memory (step 716) and terminates thereafter (step 718).

When process 700 recognizes there is no fragmentation, process 700 terminates (step 718) and can notify a garbage collection to postpone a scheduled garbage collection cycle because there is no need to perform a garbage collection at this time. When process 700 recognizes there is fragmentation, process 700 can notify a garbage collection to schedule garbage collection cycle in advance as a preemptive measure to avoid a possible stop-the-world collection operation.

Figure 8:
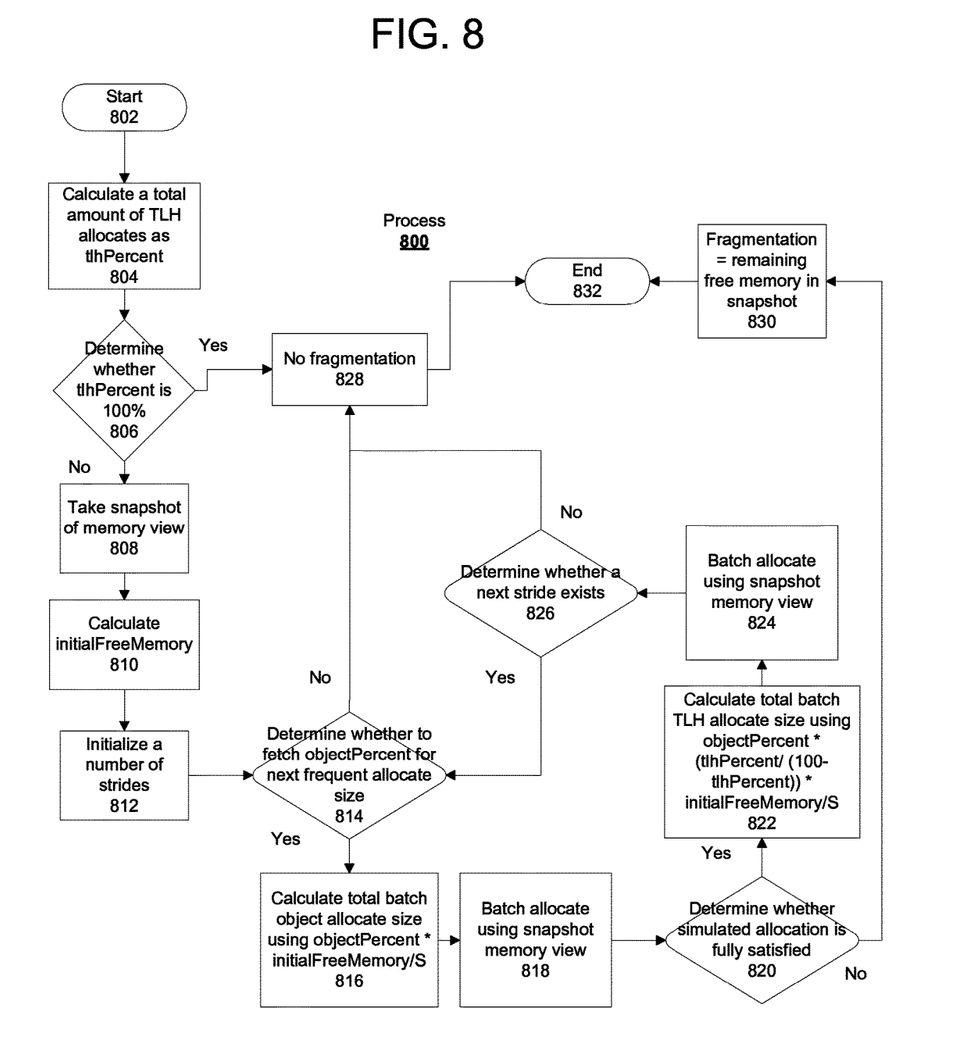
FIG. 8 is a flowchart of a process of using a batch allocate simulator for various embodiments of the disclosure.

With reference to FIG. 8 a flowchart of a process of using a batch allocate simulator for various embodiments of the disclosure is presented. Process 800 is an example of a process using the batch allocate simulator of fragmentation metric system 116 of FIG. 3 in process 700 of FIG. 7 as in an embodiment of the disclosure.

The batch allocate simulator in the example of process 800 comprises two nested loops. All allocations performed are grouped into large batches using iterations (strides) of allocation. Allocations in the simulation use a combination of large object and frequent object allocates in combination with thread local heap allocates.

Process 800 begins (step 802) and calculates a total amount of thread local heap (TLH) allocates as tlhPercent (step 804). Process 800 determines whether tlhPercent is 100% (step 806). Responsive to a determination tlhPercent is 100%, process 800 yields no fragmentation (step 828) and terminates thereafter (step 832). The variable tlhPercent is calculated as a complement to all object allocate percentages as: (100%−sum of all (objectPercent))

Responsive to a determination tlhPercent not is 100%; process 800 takes a snapshot of memory view (step 808). Process 800 calculates initialFreeMemory (step 810).

Process 800 initializes a number of strides, where strides are denoted as S (step 812). For each stride, process 800 interleaves large object allocations and TLH allocations. For each frequent allocate size, process 800 batch allocates a fraction, expressed as 1/S, of a total remaining heap allocation for this particular size, according to the allocation profiler. Process 800 also batch allocates a proportional amount of thread local heap memory. For example, using entries of size1 20%, size2 10%, TLH 70% and number of total strides S=10, each stride allocates 2% size1 (of the initial snapshot size), 70*20/(20+10)/10=4.7% of TLH, 1% of size2 and 2.3% TLH. In total 10×(2%+4.7%+1%+2.3%) =100%.

Process 800 determines whether to fetch objectPercent for a next frequent allocate size (step 814). Responsive to a determination to not fetch objectPercent for a next frequent allocate size (there are no frequent objects or was able to fully satisfy all allocates), process 800 recognizes there is no fragmentation (step 828) as before. When there is a failure to (even partially) satisfy any of the batch allocates of objects, the simulation performed using process 800 is terminated (step 832).

Responsive to a determination to fetch objectPercent for a next frequent allocate size, process 800 calculates a total batch object allocate size using objectPercent*initialFreeMemory/S (step 816). Process 800 performs batch allocate using the snapshot memory view (step 818). Process 800 performs an iteration of the batch allocate simulation using the total batch object allocate size calculated.

Process 800 determines whether the simulated allocation is fully satisfied (step 820). Responsive to a determination the simulated allocation was not fully satisfied; process 800 reports fragmentation is equal to the remaining free memory in the snapshot (step 830) and terminates thereafter (step 832).

Responsive to a determination the simulated allocation was fully satisfied; process 800 calculates a total batch TLH allocate size using objectPercent*(tlhPercent/(100−tlhPercent))*initialFreeMemory/S (step 822). Process 800 performs a batch allocate using the snapshot memory view (step 824). Process 800 performs an iteration of the batch allocate simulation using the total batch TLH allocate size calculated corresponding to an associated total batch object allocate size calculated in step 816.

Process 800 determines whether a next stride exists (step 826). Responsive to a determination a next stride exists process 800 returns to perform step 814 as before. Responsive to a determination a next stride does not exist process 800 determines no fragmentation in step 828 as before.

Batch allocation means individual objects (sizes) are not allocated, rather large groups (100s and 1000s of sizes) are allocated at a time. The batch processing makes the allocation simulator more efficient. Batch allocation internally can be driven either by a first-fit algorithm or best-fit algorithm (or a hybrid), whichever more resembles a real memory allocator used in a particular embodiment, in the current examples, that of a virtual machine. Because a notion of address ordering of free entries in the memory view is lost, rather than using a pure first-fit algorithm one can use an approximation. The approximation comprises a random-fit algorithm for large allocate sizes and a worst fit algorithm for thread local heap allocations. The approximation applies, because in a first-fit approach, the low address space tends to have a lower average size of free entries, because the large entries have been already consumed by the large allocations.

For the most part remainder of allocations are handled precisely. For example, when performing a batch allocate for 100 entries of 10K objects from 1000 21 KB size-class entries, 50 entries of 21 KB (21 KB size-class counter will be (batch) decremented by 5, for example, set to 950) and 50 new entries of 1 KB size (1 KB size class counter will be batch incremented by 50) used for future allocates in simulator.

However, when free entries are rather large (typically early in an application run, when the heap is not fully used and/or fragmented), some of the updates of free-memory model need to be approximated. Consider a huge free entry (for example 1 GB), and a batch allocate thread local heaps (of 128 KB sizes). In reality, a free entry even though very large, may move from one size class to a next smaller size class. In the batch simulator process, since an exact size is unknown (only size class) of the free entry, knowing whether/when it moves to the lower size class is not possible. For this case, the size of the entry is approximated with a random value between the lowest known bound and highest known bound. The lowest bound is relatively straightforward to obtain. The high bound however can be either the low bound of the next larger size class, when the size class contains no frequent entry counters or the size of the next largest frequent allocate size in the same size class.

Thus is presented in an illustrative embodiment a computer-implemented method for estimating heap fragmentation in real time, models a runtime view of free heap memory, models a runtime view of heap allocation patterns for the heap memory and takes a snapshot of the heap memory. The computer-implemented method further executes a batch allocator simulator, at a predetermined event and identifies a remaining amount of memory unused in the simulation as fragmented memory.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for estimating heap fragmentation in real time, the method comprising:
    modeling a runtime view of free heap memory;
    modeling a runtime view of heap allocation patterns for the heap memory;
    taking a snapshot of the heap memory;
    executing a batch allocator simulator, at a predetermined event by
        calculating a total batch object allocate size using objectPercent*initialFreeMemory/S, and
        calculating a total batch TLH allocate size using objectPercent*(tlhPercent/(100−tlhPercent))*initialFreeMemory/S, wherein values as calculated are used as input for each stride to indicate an amount each stride is to allocate;
    identifying a remaining amount of memory unused in the simulation as fragmented memory;
    predicting, using the amount of memory identified as fragmented memory, an estimate of an amount of free memory to be consumed before an out of memory state will be reached; and
    dynamically adjusting a pause in a trigger timing of a garbage collector responsive to the predicting.

2. The method of claim 1 wherein the modeling a runtime view of free heap memory further comprises:
    using sets of counters for size classes and for frequent allocate sizes, wherein the sets of counters are updated live during memory operations including garbage collections, allocations and heap resize actions.

3. The method of claim 1 wherein the modeling a runtime view of heap allocation patterns for the heap memory further comprises:
    tracking allocation of the heap memory according to different allocation sizes, wherein size class ranges are represented by a largest possible size in the size class ranges using an amount of bytes allocated by a particular size.

4. The method of claim 1 wherein executing a batch allocator simulator at a predetermined event further comprises:
    executing the batch allocator simulator at a predetermined event using a current allocation profile, in combination with the modeling of the runtime view of free heap memory and the modeling of the runtime view of heap allocation patterns, wherein large object allocations and frequent object allocations in combination with thread local heap allocations are interleaved during stride iterations until an amount of the memory is exhausted.

5. The method of claim 1 wherein executing a batch allocator simulator at a predetermined event further comprises:

executing the batch allocator simulator at a predetermined event using a current allocation profile, in combination with the modeling of the runtime view of free heap memory and the modeling of the runtime view of heap allocation patterns, wherein large object allocations and frequent object allocations in combination with thread local heap allocations are interleaved during stride iterations until a predetermined threshold of free memory/allocate memory is reached.

6. The method of claim 3 wherein modeling a runtime view of heap allocation patterns for the heap memory further comprises for a given allocation size, iterating through a particular profile of thread local heap sizes to calculate a set of values comprising:

probabilityAllocFits=(tlhSize−allocSize)/tlhSize
thisTlhSizeBytesAllocated=tlhAllocCount*tlhSize
thisAllocSizeTlhBytesAllocated+=
probabilityAllocFits*thisTlhSizeBytesAllocated upon completion of iterating through the particular profile of thread local heap sizes, calculating an up-sample-ratio for a particular allocate size as:

upSampleRatio=totalTlhBytesAllocated/(totalTlhBytesAllocated−thisAllocSizeTlhBytesAllocated); and extrapolating a final amount of bytes allocated by the particular allocate size as: sampledBytesAllocated*upSampleRatio.

7. A computer program product for estimating heap fragmentation in real time, the computer program product comprising:
a computer readable storage device containing computer executable program code stored thereon, the computer executable program code comprising:
computer executable program code for modeling a runtime view of free heap memory;
computer executable program code for modeling a runtime view of heap allocation patterns for the heap memory;
computer executable program code for taking a snapshot of the heap memory;
computer executable program code for executing a batch allocator simulator, at a predetermined event, wherein the computer executable program code for executing a batch allocator simulator at a predetermined event further comprises:
computer executable program code for calculating a total batch object allocate size using objectPercent*initialFreeMemory/S; and
computer executable program code for calculating a total batch TLH allocate size using objectPercent*(tlhPercent/(100−tlhPercent))*initialFreeMemory/S, wherein values as calculated are used as input for each stride to indicate an amount each stride is to allocate;
computer executable program code for identifying a remaining amount of memory unused in the simulation as fragmented memory;
computer executable program code for predicting, using the amount of memory identified as fragmented memory, an estimate of an amount of free memory to be consumed before an out of memory state will be reached; and
computer executable program code for dynamically adjusting a pause in a trigger timing of a garbage collector responsive to the predicting.

8. The computer program product of claim 7 wherein computer executable program code for modeling a runtime view of free heap memory further comprises:
computer executable program code for using sets of counters for size classes and for frequent allocate sizes, wherein the sets of counters are updated live during memory operations including garbage collections, allocations and heap resize actions.

9. The computer program product of claim 7 wherein computer executable program code for modeling a runtime view of heap allocation patterns for the heap memory further comprises:
computer executable program code for tracking allocation of the heap memory according to different allocation sizes, wherein size class ranges are represented by a largest possible size in the size class ranges using an amount of bytes allocated by a particular size.

10. The computer program product of claim 7 wherein the computer executable program code for executing a batch allocator simulator at a predetermined event further comprises:
computer executable program code for executing the batch allocator simulator at a predetermined event using a current allocation profile, in combination with the modeling of the runtime view of free heap memory and the modeling of the runtime view of heap allocation patterns, wherein large object allocations and frequent object allocations in combination with thread local heap allocations are interleaved during stride iterations until an amount of the memory is exhausted.

11. The computer program product of claim 7 wherein the computer executable program code for executing a batch allocator simulator at a predetermined event further comprises:
computer executable program code for executing the batch allocator simulator at a predetermined event using a current allocation profile, in combination with the modeling of the runtime view of free heap memory and the modeling of the runtime view of heap allocation patterns, wherein large object allocations and frequent object allocations in combination with thread local heap allocations are interleaved during stride iterations until a predetermined threshold of free memory/allocate memory is reached.

12. The computer program product of claim 9 wherein the computer executable program code for modeling a runtime view of heap allocation patterns for the heap memory further comprises
computer executable program code for a given allocation size, for iterating through a particular profile of thread local heap sizes to calculate a set of values comprising:

probabilityAllocFits=(tlhSize−allocSize)/tlhSize
thisTlhSizeBytesAllocated=tlhAllocCount*tlhSize
thisAllocSizeTlhBytesAllocated+=
probabilityAllocFits*thisTlhSizeBytesAllocated upon completion of iterating through the particular profile of thread local heap sizes, calculating an up-sample-ratio for a particular allocate size as:

upSampleRatio=totalTlhBytesAllocated/(totalTlhBytesAllocated−thisAllocSizeTlhBytesAllocated); and extrapolating a final amount of bytes allocated by the particular allocate size as: sampledBytesAllocated*upSampleRatio.

13. An apparatus for estimating heap fragmentation in real time, the apparatus comprising:
- a communications fabric;
- a memory connected to the communications fabric, wherein the memory contains computer executable program code;
- a communications unit connected to the communications fabric;
- an input/output unit connected to the communications fabric;
- a display connected to the communications fabric; and
- a processor unit connected to the communications fabric, wherein the processor unit executes the computer executable program code to direct the apparatus to:
  - model a runtime view of free heap memory;
  - model a runtime view of heap allocation patterns for the heap memory;
  - take a snapshot of the heap memory;
  - execute a batch allocator simulator, at a predetermined event by
    - calculating a total batch object allocate size using objectPercent*initialFreeMemory/S, and
    - calculating a total batch TLH allocate size using objectPercent*(tlhPercent/(100−tlhPercent))*initialFreeMemory/S, wherein values as calculated are used as input for each stride to indicate an amount each stride is to allocate;
  - identifying a remaining amount of memory unused in the simulation as fragmented memory;
  - predicting, using the amount of memory identified as fragmented memory, an estimate of an amount of free memory to be consumed before an out of memory state will be reached; and
  - dynamically adjusting a pause in a trigger timing of a garbage collector responsive to the predicting.

14. The apparatus of claim 13 wherein the processor unit executes the computer executable program code to model a runtime view of free heap memory further directs the apparatus to:
- use sets of counters for size classes and for frequent allocate sizes, wherein the sets of counters are updated live during memory operations including garbage collections, allocations and heap resize actions.

15. The apparatus of claim 13 wherein the processor unit executes the computer executable program code to model a runtime view of heap allocation patterns for the heap memory further directs the apparatus to:
- track allocation of the heap memory according to different allocation sizes, wherein size class ranges are represented by a largest possible size in the size class ranges using an amount of bytes allocated by a particular size.

16. The apparatus of claim 13 wherein the processor unit executes the computer executable program code to execute a batch allocator simulator at a predetermined event further directs the apparatus to:
- execute the batch allocator simulator at a predetermined event using a current allocation profile, in combination with the modeling of the runtime view of free heap memory and the modeling of the runtime view of heap allocation patterns, wherein large object allocations and frequent object allocations in combination with thread local heap allocations are interleaved during stride iterations until an amount of the memory is exhausted.

17. The apparatus of claim 13 wherein the processor unit executes the computer executable program code to execute a batch allocator simulator at a predetermined event further directs the apparatus to:
- execute the batch allocator simulator at a predetermined event using a current allocation profile, in combination with the modeling of the runtime view of free heap memory and the modeling of the runtime view of heap allocation patterns, wherein large object allocations and frequent object allocations in combination with thread local heap allocations are interleaved during stride iterations until a predetermined threshold of free memory/allocate memory is reached.

18. The apparatus of claim 15 wherein the processor unit executes the computer executable program code to model a runtime view of heap allocation patterns for the heap memory further directs the apparatus to:
- for a given allocation size, iterate through a particular profile of thread local heap sizes to calculate a set of values comprising:

probabilityAllocFits=(tlhSize−allocSize)/tlhSize
  thisTlhSizeBytesAllocated=tlhAllocCount*tlhSize
  thisAllocSizeTlhBytesAllocated+=
  probabilityAllocFits*thisTlhSizeBytesAllocated

- upon completion of iterating through the particular profile of thread local heap sizes, calculate an up-sample-ratio for a particular allocate size as:

upSampleRatio=totalTlhBytesAllocated/(totalTlhBytesAllocated−thisAllocSizeTlhBytesAllocated); and

- extrapolate a final amount of bytes allocated by the particular allocate size as: sampledBytesAllocated*upSampleRatio.

* * * * *